(No Model.)
L. & W. H. BERGER.
STOVE PIPE DAMPER.
No. 267,827. Patented Nov. 21, 1882.
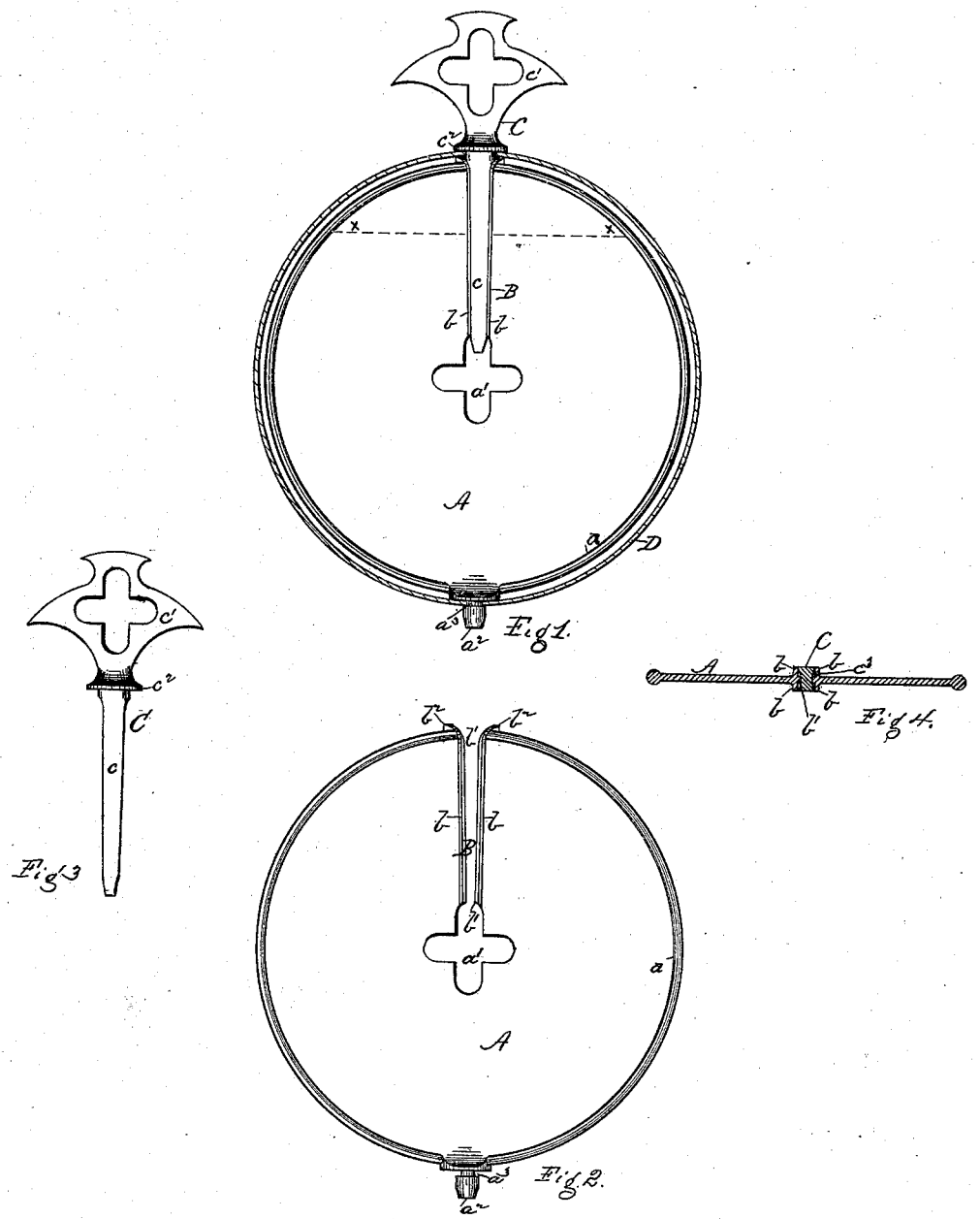

UNITED STATES PATENT OFFICE.

LEVI BERGER AND WILLIAM H. BERGER, OF PHILADELPHIA, PA.

STOVE-PIPE DAMPER.

SPECIFICATION forming part of Letters Patent No. 267,827, dated November 21, 1882.

Application filed September 28, 1882. (No model.)

*To all whom it may concern:*

Be it known that we, LEVI BERGER and WILLIAM H. BERGER, citizens of the United States, residing at Philadelphia, in the county of Philadelphia and State of Pennsylvania, have invented certain new and useful Improvements in Stove-Pipe Dampers; and we do hereby declare the following to be a full, clear, and exact description of the invention, reference being had to the accompanying drawings, which form part of this specification, in which—

Figure 1 is a plan showing damper in stove-pipe with key inserted. Fig. 2 is a plan showing damper-disk without key. Fig. 3 is a longitudinal elevation of key. Fig. 4 is a transverse section in line $x\ x$, Fig. 1.

Our invention has for its object to reduce the expense, simplify the construction, and increase the efficiency of stove-pipe dampers.

Our improvements consist in the peculiar construction and combinations of parts hereinafter fully set forth, having reference principally to the following points: First, to forming the body of the damper or diaphragm with a radial slot for the reception of a key or wedge which forms the handle and axis; second, to the combination, with a damper-diaphragm having a radial slot, of a key, wedge, or handle, which fits therein and is held firmly in place by the contractile tendency of the metal composing said diaphragm; third, to the provision of flanges on each side of the radial slot to afford a firmer bearing for the wedge or key and to prevent the sides of the slot from being sprung over each other or out of line; fourth, to forming the sides of the key with longitudinal grooves for the reception of ribs on the sides of the slot in the diaphragm, so as to prevent said key from coming out sidewise; fifth, to providing the damper-diapragm at the point of entrance of the key or wedge with projections or ears, between which and the shoulder of said key the stove-pipe will be clamped, so as to secure sufficient friction to hold the damper in any adjusted position, yet permit it to be turned with but slight exertion or pressure.

Referring to the accompanying drawings, A indicates the damper-diaphragm, which is a disk of cast-iron, formed preferably with a beaded edge, $a$. Said disk should have an opening for the passage of gases, and this opening is preferably located centrally, as shown at $a'$. The disk is formed with a radial slot (shown at B) extending from the central opening, $a'$, to and through the edge $a$. On each side of the slot, and on both sides of the damper, are flanges $b\ b$, as shown, which have the effect practically of thickening the metal at this part of the disk. The sides of the slot have longitudinal ribs $b'\ b'$. C represents a key or wedge, composed of a shank, $c$, and handle $c'$, the latter terminating in a shoulder, $c^2$. The sides of the key or wedge are formed with longitudinal grooves $c^3$, which receive the ribs $b'\ b'$ when said key is driven or pushed into the slot B. The flanges $b\ b$ are extended beyond the rim or edge $a$, forming flaring projections $b^2\ b^2$, which serve to guide the key when being inserted into the slot B. These projections also afford bearings or friction-surfaces, between which and the key-shoulder $c^2$ the stove-pipe (shown at D) is clamped. In line axially with the slot B, and projecting from the edge $a$, is a trunnion, $a^2$, which is cast on the diaphragm A. Preferably this trunnion has an annular groove, $a^3$, to receive the edge of the opening in the stove-pipe in which it fits.

The operation is as follows: The disk is first inserted in the stove-pipe and the trunnion $a^2$ caused to enter the opening formed in the pipe for that purpose. The key C is next inserted through another opening in the pipe directly opposite the first-mentioned opening and pushed or driven into the radial slot B. It should be remarked here that the key or wedge is made in cross-section, of slightly-greater width than said slot, so that when driven in the latter it will spread the sides thereof slightly apart, the metal of the disk giving or springing to allow the same, yet tending constantly to return to normal position. This holds the key firmly in place in the disk, yet permits it to be withdrawn from the latter, if necessary, the holding action of the disk on the key being much like that of wood into which a nail has been driven. The key or wedge is to be pushed or driven into the disk-slot far enough to clamp the stove-pipe D between the projections $b^2$ and the shoulder $c^2$ with sufficient pressure to hold the damper in any position in which it may be adjusted, yet permit it to be easily turned by slight force applied to the handle c' outside. Should the pressure be found too great or too slight, it may be lessened or increased to any necessary extent by either slightly moving in or drawing out the key C.

The advantages of the construction hereinbefore described are briefly as follows:

First, simplicity and cheapness of construction. The entire damper consists of but two pieces, each of which is but a plain casting. Neither of these parts require any finishing to complete it, and both may be readily put in position and fastened together for operation without any skill or real trouble.

Second, efficiency. The key, when duly inserted in the slot, is held there firmly and constantly by the contractile tendency of the disk, and will not come out either lengthwise or sidewise. The contracting tendency of the disk holds said key from working out radially, and the flanges on either side of the disk-slot give so much bearing that it cannot be worked out in turning the damper, being also held by the slot-ribs entering in its sides. The damper and its handle, so far as danger of becoming loose with respect to each other is concerned, are thus practically integral. The amount of friction or clamping pressure between the damper and the stove-pipe is adjustable by moving the key radially so that the damper may be easily turned, yet will remain when adjusted in any set position. We prefer to make the disk of gray or ordinary cast-iron and the wedge or key of malleable iron. The gray iron secures cheapness with sufficient spring or resiliency for our purpose, while the malleable metal of the key secures softness for the latter, so that the edges of the slot in the disk cut into or adhere tenaciously to it. Malleable iron may be also tinned without previous "tumbling," such as gray iron requires, and this enables us to give a tin coating to the projecting handle c'. If preferred, however, the disk and the key may both be of the same kind of iron, or any other suitable metal may be substituted for the latter.

We are aware that a stove-pipe damper has been patented in which is employed a disk with a radial slot; but such slot is crossed at two points by loops, so that there is no contractile tendency of the metal, nor is it in that case proposed to hold the key or handle by any such method.

We are further aware that a stove-pipe damper has been patented showing a forked handle which straddles a disk, and is designed to be held in place by the spring of the tines of such handle; but the body of metal in the handle being small affords but slight spring, whereas in our construction we avail ourselves of the whole mass of the disk as a spring. Further, such straddling handle requires an extra large size hole in the stove-pipe for its passage, while our handle-key requires only a small hole. We do not accordingly claim broadly a radial slot in a stove-pipe damper, but only an open radial slot the sides of which are free to spring apart. Neither do we broadly claim utilizing the contractile tendency of metal to hold a stove-pipe damper and its handle together, but only the special construction herein shown and described, whereby we avail ourselves of the disk as a spring or clamp for gripping the key.

What we claim as our invention is as follows:

1. A damper comprising a metal disk with a radial slot for the reception of a key, wedge, or handle, said slot being open throughout, whereby its sides may be sprung apart, and which tend to contract upon such key, wedge, or handle, substantially as shown.

2. The combination, in a damper, of a disk, A, having a radial slot, B, and a key or wedge, C, inserted therein and held in place by the contractile tendency of the metal of the disk, substantially as shown and described.

3. The disk A, having radial slot B, with flanges $b\ b$ on each side thereof, substantially as shown and described.

4. The disk A, having radial slot B, with longitudinal ribbed sides, substantially as shown and described.

5. The disk A, having a radial slot, B, and projections $b^2\ b^2$ on either side thereof, projecting beyond the edge of said disk, substantially as shown and described.

6. The key or wedge C, having a shank with longitudinally-grooved sides, and a handle, c', substantially as shown and described.

7. The combination of a radially-slotted disk and a longitudinally-grooved key or wedge, substantially as shown and described.

8. The combination, with a slotted disk, A, of a key or wedge radially adjustable therein, so as to vary the pressure or friction between said parts and an interposed stove-pipe.

In testimony that we claim the foregoing we have hereunto set our hands this 26th day of September, 1882.

LEVI BERGER.
WILLIAM H. BERGER.

Witnesses:
WALTER S. GIBSON,
WILL H. POWELL.